US011945310B2

(12) United States Patent
Matsui et al.

(10) Patent No.: US 11,945,310 B2
(45) Date of Patent: Apr. 2, 2024

(54) DISPLAY SYSTEM

(71) Applicant: Panasonic Intellectual Property Management Co., Ltd., Osaka (JP)

(72) Inventors: Satoshi Matsui, Kyoto (JP); Norikazu Katsuyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 63 days.

(21) Appl. No.: 17/533,751

(22) Filed: Nov. 23, 2021

(65) Prior Publication Data

US 2022/0080832 A1 Mar. 17, 2022

Related U.S. Application Data

(63) Continuation of application No. PCT/JP2020/016455, filed on Apr. 14, 2020.

(30) Foreign Application Priority Data

May 31, 2019 (JP) ................. 2019-102925

(51) Int. Cl.
*B60K 37/02* (2006.01)
(52) U.S. Cl.
CPC ...... *B60K 37/02* (2013.01); *B60K 2370/1529* (2019.05); *B60K 2370/166* (2019.05);
(Continued)
(58) Field of Classification Search
CPC .............. B60K 37/02; B60K 37/06; B60K 2370/1529; B60K 2370/166;
(Continued)

(56) References Cited

U.S. PATENT DOCUMENTS 11,482,195 B2 * 10/2022 Matsui .................. G09G 5/377
11,506,906 B2 * 11/2022 Fujita ..................... G06V 20/56
(Continued)

FOREIGN PATENT DOCUMENTS

JP 2015-52656 3/2015
JP 2015-101311 6/2015
(Continued)

OTHER PUBLICATIONS

Extended European Search Report dated Jul. 1, 2022 in corresponding European Patent Application No. 20813893.3.
(Continued)

*Primary Examiner* — Christopher E Leiby
(74) *Attorney, Agent, or Firm* — Wenderoth, Lind & Ponack, L.L.P.

(57) ABSTRACT

A display system includes a posture detection device that detects a posture variation amount of a moving body, a posture estimator that estimates a posture state of the moving body based on the posture variation amount, a reference position setting device that sets a reference position of an image based on the posture state, a correction processing device that sets a correction amount of a display position of the image based on the posture variation amount, and a display processing device that controls a display position of the image based on the reference position, the correction amount, and a timing command.

11 Claims, 16 Drawing Sheets

(52) U.S. Cl.
CPC ...... *B60K 2370/48* (2019.05); *B60K 2370/52* (2019.05); *B60Y 2200/11* (2013.01)

(58) Field of Classification Search
CPC ............ B60K 2370/48; B60K 2370/52; B60K 2370/149; B60K 2370/152; B60K 35/00; B60Y 2200/11; G02B 27/0101; G02B 2027/0138; G02B 2027/014; G02B 2027/0141; G02B 2027/0183; G02B 2027/0198; G09G 2340/04; G09G 2340/0464; G09G 2340/0471; G09G 3/001; G09G 2354/00; G09G 2380/10; G06F 3/011; G06F 3/147; H04N 9/3185; H04N 9/3194
See application file for complete search history.

(56) References Cited

U.S. PATENT DOCUMENTS

| | | | |
|---|---|---|---|
| 2016/0202472 A1 | 7/2016 | Sasaki | |
| 2016/0216521 A1 | 7/2016 | Yachida et al. | |
| 2017/0050542 A1* | 2/2017 | Shigeta | B60N 2/16 |
| 2019/0025580 A1* | 1/2019 | Nagano | G02B 27/01 |
| 2019/0139286 A1* | 5/2019 | Shimoda | G09G 3/001 |
| 2019/0333481 A1* | 10/2019 | Hato | G02B 27/0101 |
| 2020/0064640 A1* | 2/2020 | Nagano | G09G 3/001 |
| 2020/0273435 A1 | 8/2020 | Shibata et al. | |
| 2020/0311442 A1 | 10/2020 | Shibata et al. | |
| 2020/0398752 A1* | 12/2020 | Matsui | B60R 11/02 |
| 2021/0019867 A1* | 1/2021 | Hayashi | H04N 9/3194 |
| 2021/0031776 A1* | 2/2021 | Shibata | G09G 5/38 |
| 2021/0109357 A1* | 4/2021 | Matsui | G09G 5/00 |
| 2021/0109358 A1* | 4/2021 | Matsui | B60R 11/0229 |
| 2021/0110796 A1* | 4/2021 | Matsui | G02B 27/01 |
| 2021/0389596 A1* | 12/2021 | Fujita | G06T 15/20 |
| 2021/0407466 A1* | 12/2021 | Matsui | G02B 27/0101 |
| 2022/0028307 A1* | 1/2022 | Matsui | H04N 7/18 |
| 2022/0072959 A1* | 3/2022 | Matsui | G09G 5/00 |
| 2022/0319365 A1* | 10/2022 | Tsuji | G06V 20/58 |

FOREIGN PATENT DOCUMENTS

| | | |
|---|---|---|
| WO | 2019/092995 | 5/2019 |
| WO | 2019/092996 | 5/2019 |

OTHER PUBLICATIONS

English translation of the International Preliminary Report on Patentability dated Dec. 9, 2021 in corresponding International Application No. PCT/JP2020/016455.

International Search Report dated Jul. 21, 2020 in International (PCT) Application No. PCT/JP2020/016455 with English translation.

Japanese Office Action dated Dec. 5, 2023 in corresponding Japanese Patent Application No. 2021-522690, with English machine translation.

Communication pursuant to Article 94(3) dated Oct. 13, 2023 in European Application No. 20 813 893.3.

* cited by examiner

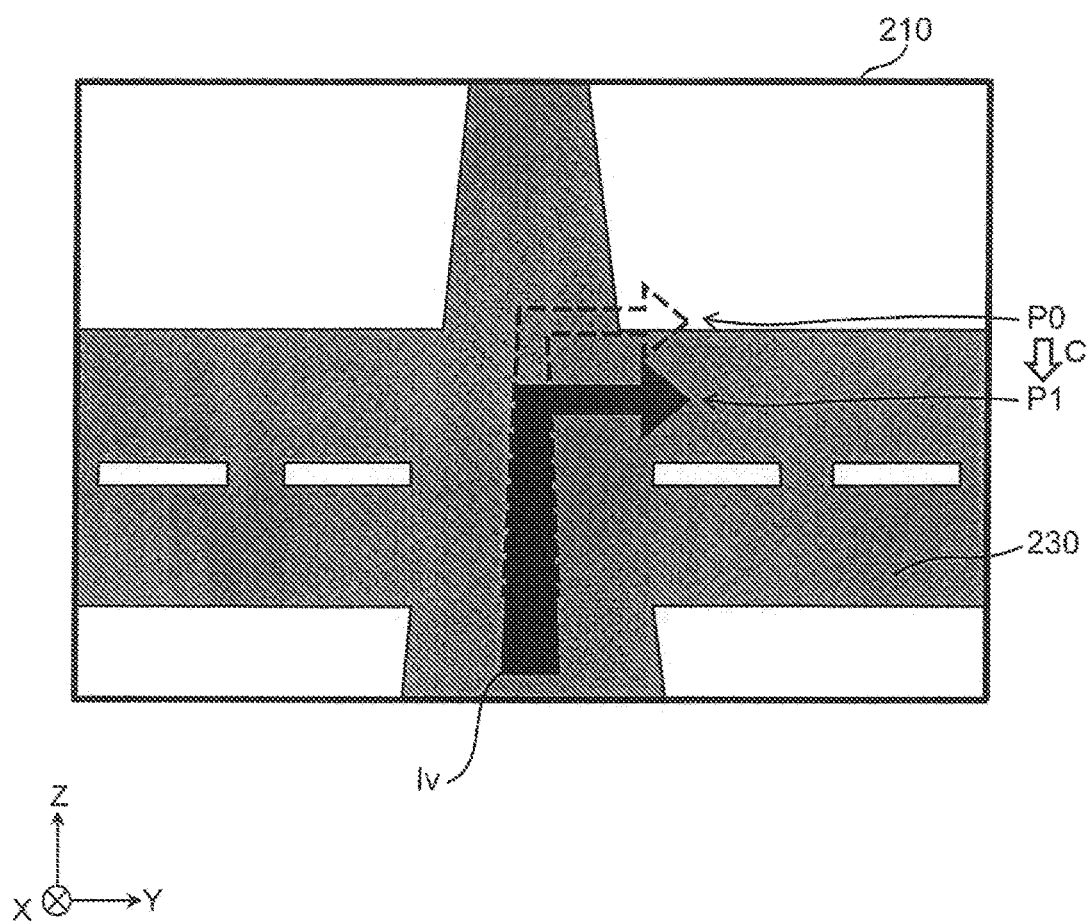

DISPLAY SYSTEM

CROSS-REFERENCE TO RELATED APPLICATIONS

This is a continuation application of International Application No. PCT/JP2020/016455, with an international filing date of Apr. 14, 2020, which claims priority of Japanese Patent Application No. 2019-102925 filed on May 31, 2019, the content of which is incorporated herein by reference.

BACKGROUND OF THE INVENTION

1. Technical Field

The present disclosure relates to a display system that controls a display position of an image according to the movement of a moving body.

2. Description of Related Art

JP 2015-101311 A discloses a vehicle information projection system that performs augmented reality (AR) display using a head-up display (HUD) device. The HUD device projects light representing a virtual image on the windshield of a vehicle so that a viewer who is an occupant of the vehicle visually recognizes the virtual image together with an actual view of the outside world of the vehicle. For example, a virtual image representing a guide route of the vehicle is displayed in association with a display target (for example, road) in the actual view. In this manner, the occupant can confirm the guide route while visually recognizing the actual view. The vehicle information projection system of JP 2015-101311 A includes a vehicle speed sensor and corrects a display position of the virtual image according to acceleration. This restricts generation of position displacement of the virtual image when the vehicle is suddenly decelerated and suddenly accelerated.

SUMMARY

However, the position displacement of an image may occur not only at the time of sudden deceleration and sudden acceleration of a vehicle but also at the time of stop, for example. This is because the posture of the vehicle changes according to the number of passengers of the vehicle, a loading state of baggage, and an amount of fuel in a fuel tank.

The present disclosure provides a display system that suppresses position displacement of an image.

A display system of the present disclosure includes:
- a posture detection device that detects a posture variation amount of a moving body;
- a posture estimator that estimates a posture state of the moving body based on the posture variation amount;
- a reference position setting device that sets a reference position of an image based on the posture state;
- a correction processing device that sets a correction amount of a display position of the image based on the posture variation amount; and
- a display processing device that controls a display position of the image based on the reference position, the correction amount, and a timing command.

These general and specific aspects may be realized by a system, a method, and a computer program, and a combination of these.

According to the display system of the present disclosure, it is possible to provide a display system that suppresses position displacement of an image.

BRIEF DESCRIPTION OF THE DRAWINGS

FIG. 4C is a diagram showing a display example of a virtual image after correction.

MODE(S) FOR CARRYING OUT THE INVENTION

Findings that Form the Basis of the Present Disclosure

Main causes of position displacement of an image are vibration due to unevenness of a traveling path and a suspension, entry to a slope and exit from a slope. However, other than these, there is also a change in the posture of a vehicle itself in a stationary state due to a loading state of the vehicle. The loading state of the vehicle changes depending on, for example, the number of passengers, an amount of fuel in a fuel tank, and a weight of loaded baggage. When states of these change, the vehicle posture in a stationary state changes, and a reference position at which an image is displayed is displaced. Therefore, even if correction for vibration as a cause is performed in a traveling state, position displacement occurs.

Further, if displacement of a reference position in a stationary state of the vehicle is corrected separately from vibration correction in the stationary state, the correction becomes conspicuous, which gives a sense of discomfort to the driver.

The display system of the present disclosure also corrects displacement of a reference position of an image in a stationary state of a vehicle at the time of correction of displacement by vibration correction during traveling. In this manner, the displacement of a reference position of an image can be corrected without being conspicuous to the driver.

FIRST EMBODIMENT

Hereinafter, the first embodiment will be described with reference to the drawings. In the first embodiment, a case where the moving body is a vehicle such as an automobile and the display system is a head-up display (HUD) system that displays a virtual image as an image in front of the windshield of the vehicle will be described as an example.

1. Configuration of Display System

Figure 1:
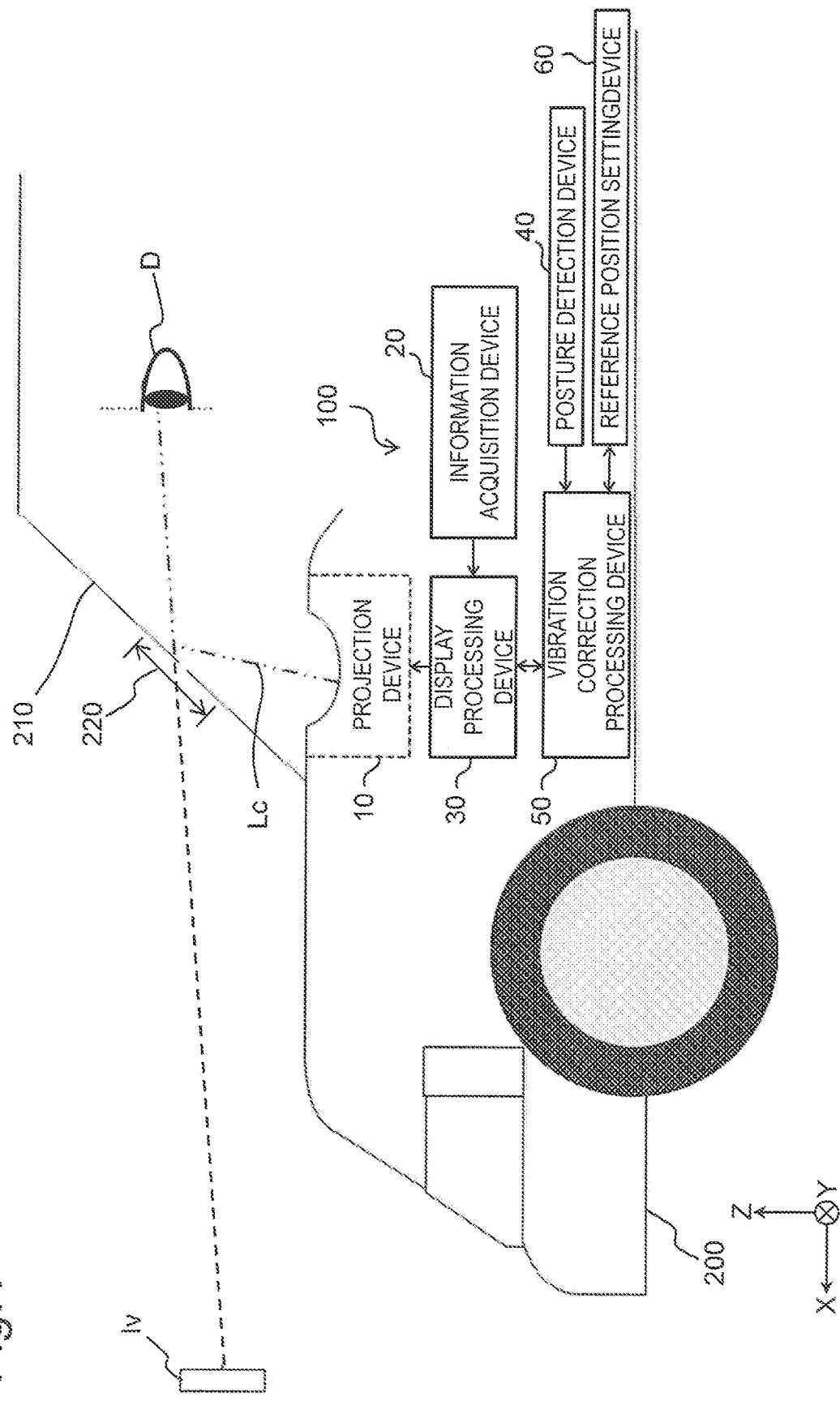
FIG. 1 is a diagram for explaining a head-up display (HUD).

FIG. 1 is a diagram for explaining the HUD system. In FIG. 1, a roll axis of a vehicle 200 is the X axis, a pitch axis of the vehicle 200 is the Y axis, and a yaw axis of the vehicle 200 is the Z axis. That is, the X axis is an axis that is orthogonal to the Y axis and the Z axis and is along a line-of-sight direction of an occupant D who visually recognizes a virtual image Iv. The Y axis is an axis along the left-right direction when viewed from the occupant D who visually recognizes the virtual image Iv. The Z axis is an axis along the height direction of the vehicle 200.

A display system 100 of the present embodiment is an HUD system that performs what is called augmented reality (AR) display in which the virtual image Iv is superimposed on an actual view in front of a windshield 210 of the vehicle 200. The virtual image Iv indicates predetermined information. For example, the virtual image Iv is a figure and a character indicating a route for guiding to a destination, an estimated time of arrival at the destination, a traveling direction, a speed, various warnings, and the like. The display system 100 is installed in the vehicle 200 and projects display light Lc representing the virtual image Iv into a display area 220 of the windshield 210 of the vehicle 200. In the present embodiment, the display area 220 is a partial area of the windshield 210. Note that the display area 220 may be the entire area of the windshield 210. The display light Lc is reflected by the windshield 210 toward the inside of the vehicle. In this manner, the occupant (viewer) D in the vehicle 200 visually recognizes the reflected display light Lc as the virtual image Iv in front of the vehicle 200.

The display system 100 includes a projection device 10, an information acquisition device 20, a display processing device 30, a posture detection device 40, a vibration correction processing device 50, and a reference position setting device 60.

The projection device 10 projects the display light Lc representing the virtual image Iv into the display area 220. The projection device 10 includes, for example, a liquid crystal display element that displays an image of the virtual image Iv, a light source such as an LED that illuminates the liquid crystal display element, a mirror and a lens that reflect the display light Lc of the image displayed by the liquid crystal display element onto the display area 220, and the like. The projection device 10 is installed, for example, in the dashboard of the vehicle 200.

The information acquisition device 20 acquires a position of the vehicle and information outside the vehicle. Specifically, the information acquisition device 20 measures a position of the vehicle 200 and generates position information indicating the position. The information acquisition device 20 further acquires outside-vehicle information indicating an object, a distance to the object, and the like. The object is a person, a sign, a road, or the like. The information acquisition device 20 outputs vehicle-related information including at least one of the position information of the vehicle 200 and the outside-vehicle information.

The display processing device 30 controls the display of the virtual image Iv based on the vehicle-related information and the like obtained from the information acquisition device 20 and outputs image data of the virtual image Iv to the projection device 10. The display processing device 30 may control the display of the virtual image Iv based on a display timing (display time) of the virtual image Iv or a combination of the vehicle-related information and the display timing. The display timing is, for example, repetition of display for ten seconds and non-display for one second.

The posture detection device 40 detects a posture variation of the vehicle 200. The vibration correction processing device 50 calculates a correction amount of the display position of the virtual image Iv based on the posture variation of the vehicle 200 detected by the posture detection device 40.

The reference position setting device 60 estimates the vehicle posture on the basis of the posture variation of the vehicle 200 detected by the posture detection device 40, and calculates a reference position of the display position of the virtual image Iv.

Figure 2:
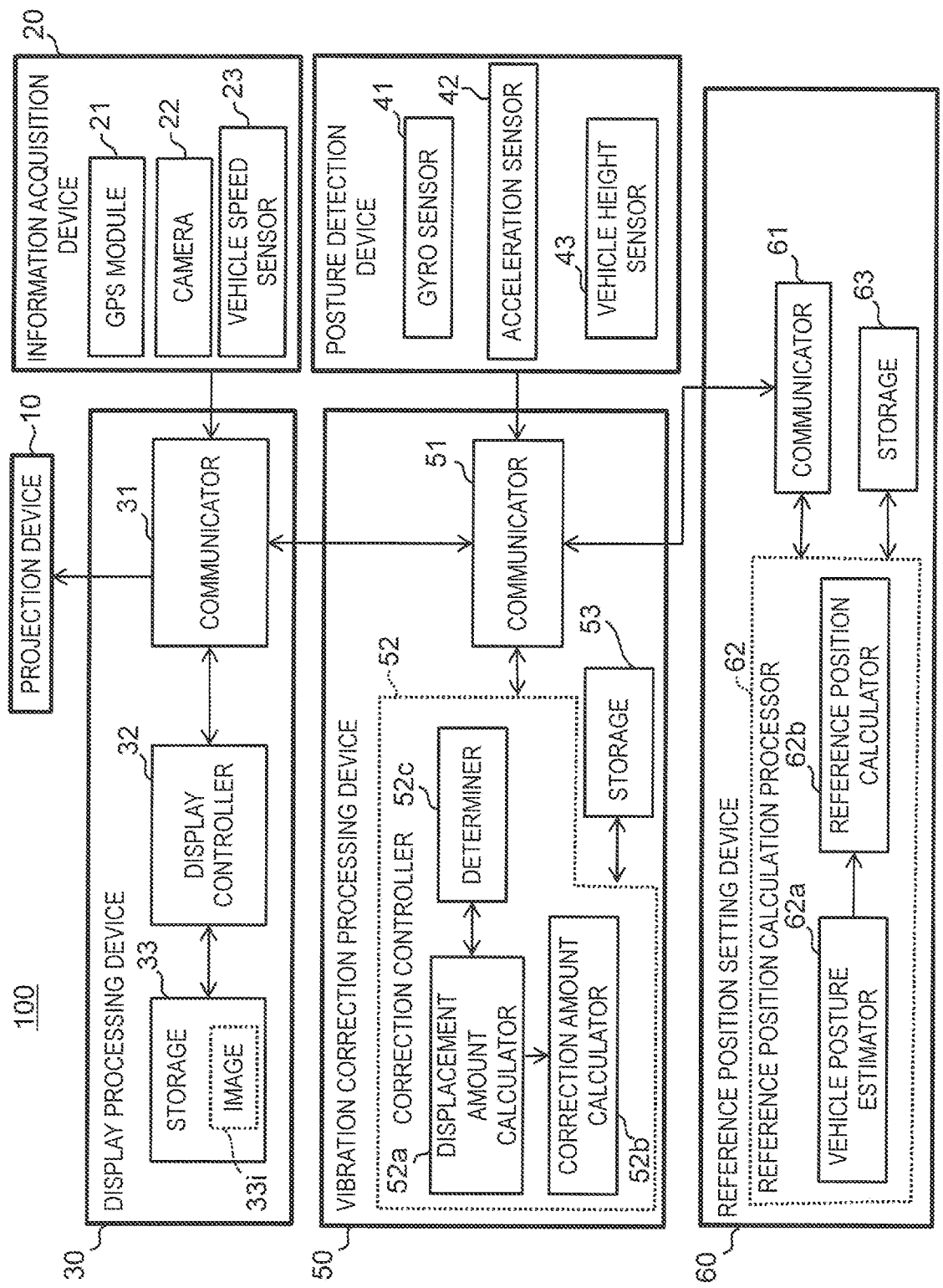
FIG. 2 is a block diagram showing an internal configuration of a display system according to a first embodiment.

FIG. 2 is a block diagram showing an internal configuration of the display system 100.

In the present embodiment, the information acquisition device 20 includes a global positioning system (GPS) module 21 that detects a position indicating the current position of the vehicle 200 in the geographical coordinate system. Specifically, the GPS module 21 receives radio waves from GPS satellites and measures the latitude and longitude of the receiving point. The GPS module 21 generates position information indicating the measured latitude and longitude. The information acquisition device 20 further includes a camera 22 that captures an outside view and generates captured image data. The information acquisition device 20, for example, identifies an object from the captured image data by image processing and measures a distance to the object. The information acquisition device 20 generates, as the outside-vehicle information, information indicating an object, a distance to the object, and the like. The information acquisition device 20 outputs the vehicle-related information including the position information and the outside-vehicle information to the display processing device 30. Note that the captured image data generated by the camera 22 may be output to the display processing device 30. The information acquisition device 20 further includes a vehicle speed sensor 23 that detects the speed of the vehicle 200.

The display processing device 30 includes a communicator 31, a display controller 32, and a storage 33.

The communicator 31 includes a circuit that communicates with external devices in compliance with a predetermined communication standard (for example, LAN, Wi-Fi (registered trademark), Bluetooth (registered trademark), USB, HDMI (registered trademark), controller area network (CAN), and serial peripheral interface (SPI)).

The display controller 32 can be realized by a semiconductor element or the like. The display controller 32 can be composed of, for example, a microcomputer, a CPU, an MPU, a GPU, a DSP, an FPGA, and an ASIC. A function of the display controller 32 may be configured only by hardware, or may be realized by combining hardware and software. The display controller 32 realizes a predetermined function by reading data and a program stored in the storage 33 and performing various types of arithmetic processing.

The storage 33 is a storage medium that stores a program and data required to realize a function of the display processing device 30. The storage 33 can be realized by, for example, a hard disk (HDD), an SSD, a RAM, a DRAM, a ferroelectric memory, a flash memory, a magnetic disk, or a combination of these.

The storage 33 stores a plurality of pieces of image data 33i representing the virtual image Iv. The display controller 32 determines the virtual image Iv to be displayed based on the vehicle-related information obtained from the information acquisition device 20. The display controller 32 reads out the image data 33i of the determined virtual image Iv from the storage 33 and outputs the data to the projection device 10. Furthermore, the display controller 32 sets the display position of the virtual image Iv. The display controller 32 outputs the display information indicating whether the virtual image Iv is to be displayed or not or is being displayed or not to the vibration correction processing device 50.

The posture detection device 40 includes, for example, a gyro sensor 41 that detects angular velocities (roll angular velocity, pitch angular velocity, yaw angular velocity) of three axes of X, Y, and Z, an acceleration sensor 42 in three axis directions of X, Y, and Z, and a vehicle height sensor 43 that detects a height of the vehicle 200 from a road surface. The gyro sensor 41 outputs a detected angular velocity, the acceleration sensor 42 outputs a detected acceleration, and the vehicle height sensor 43 outputs a detected vehicle height to the vibration correction processing device 50 and the reference position setting device 60 as posture variation information (posture variation amount) indicating the posture variation of the vehicle 200. Further, the posture detection device 40 may include other publicly-known sensors. The gyro sensor 41 having the function of the posture detection device 40, the acceleration sensor, the vehicle height sensor 43, and the like may be built in one device or individually attached to the vehicle 200. Further, the gyro sensor 41 may directly detect a roll angle, a pitch angle, and a yaw angle, or the posture detection device 40 may include a calculator, and the calculator may integrate angular velocity information detected by the gyro sensor 41 and output the integrated angular velocity information as angle information.

The vibration correction processing device 50 includes a communicator 51, a correction controller 52, and a storage 53. The communicator 51 has a configuration similar to that of the communicator 31.

The correction controller 52 is an arithmetic device that can be realized by a semiconductor element or the like. The correction controller 52 can be composed of, for example, a microcomputer, a CPU, an MPU, a GPU, a DSP, an FPGA, and an ASIC. The correction controller 52 realizes a predetermined function by reading data and a program stored in the storage 53 in the vibration correction processing device 50 and performing various types of arithmetic processing. A function of the correction controller 52 may be configured only by hardware, or may be realized by combining hardware and software.

The correction controller 52 includes a displacement amount calculator 52a, a correction amount calculator 52b, and a determiner 52c as a functional configuration.

The displacement amount calculator 52a calculates the posture (angle displacement amount) of the vehicle 200 based on the posture variation information output by the posture detection device 40. The displacement amount indicates a change amount by which the posture changes from a posture state serving as a reference of a moving body. The posture state serving as a reference of a moving body is, for example, a vehicle state in a stationary state placed in a horizontal state. For example, the displacement amount calculator 52a calculates an angle (a pitch angle) around a pitch axis of the vehicle 200 by integrating the angular velocity detected by the gyro sensor 41. In this manner, a displacement amount (angle) of the vehicle 200 in a rotation direction around the Y axis (pitch axis) shown in FIG. 1 can be calculated. Similarly, a yaw angle or a roll angle may be calculated, and, for example, all the angles around the X axis, the Y axis, and the Z axis may be calculated. In the posture state that serves as a reference for a moving body, each of a pitch angle, a yaw angle, and a roll angle is 0°. In this manner, the posture of the vehicle 200, that is, a displacement amount that is an angle with respect to directions of thee axes is calculated. Note that, in a case where the posture detection device 40 outputs a roll angle, a pitch angle, and a yaw angle, these values are processed as a displacement amount.

The correction amount calculator 52b calculates a correction amount of the display position of the virtual image Iv according to the posture variation (angle displacement amount) of the vehicle 200. Specifically, the correction amount calculator 52b converts the displacement amount of the angle (pitch angle) calculated by the displacement amount calculator 52a into the number of pixels, and determines a correction amount by which the number of pixels corresponding to the displacement (hereinafter, also referred to as "the number of displacement pixels") is eliminated. For example, the displacement amount calculator 52a determines a correction amount by which a displacement amount of the yaw angle is eliminated. The correction amount calculator 52b outputs the calculated correction amount to the display processing device 30.

The determiner 52c determines whether or not to reset the correction amount to zero on the basis of the posture variation (angle displacement amount) of the vehicle 200 and the display information of the display processing device. Cases where the determiner 52c determines to reset the correction amount to zero include, for example, at the time of occurrence of large amplitude for which correction is not supported, at the time of turning right or left, at the time of large fluctuation in the yaw direction due to curve traveling, and at the time of entry to and exit from a slope. The determiner 52c determines whether or not to reset the correction amount to zero by comparing a magnitude relationship between a predetermined threshold and an output of the posture detection device 40 or a result of arithmetic processing of an output of the posture detection device 40 (hereinafter, referred to as a variation amount X). Further, the determiner 52c determines to reset the correction amount to zero also when the virtual image is not displayed. When the virtual image Iv is not displayed, a signal indicating the fact is transmitted from the display controller 32 to the correction controller 52.

Calculation processing of an output of the posture detection device 40 may be performed by the posture detection device 40 or the displacement amount calculator 52a and the determiner 52c of the vibration correction processing device 50, or another configuration.

The variation amount X is, for example, a variation amount in certain time of an angle obtained by integrating the angular velocity detected by the gyro sensor 41. For example, the determiner 52c outputs, for example, Boolean binary data as a determination flag. When the variation amount X is equal to or less than a first threshold value a, the data is TRUE, and when the variation amount X is larger than the first threshold value a, the data is FALSE. Data output by the determiner 52c is not limited to a Boolean type, and may be an integer type or may be other types.

The storage 53 is a storage medium that stores a program and data required to realize a function of the correction controller 52. Therefore, for example, a program and data necessary for causing an arithmetic device such as a processor to function as the determiner 52c are also stored in the storage 53. The storage 53 can be realized by, for example, a hard disk (HDD), an SSD, a RAM, a DRAM, a ferroelectric memory, a flash memory, a magnetic disk, or a combination of these.

The reference position setting device 60 includes a communicator 61, a reference position calculation processor 62, and a storage 63. The communicator 61 has a configuration similar to that of the communicators 31 and 51. The communicator 61, which can communicate with the communicator 31 via the communicator 51, may directly communicate with the communicator 31.

The reference position calculation processor 62 is an arithmetic device that can be realized by a semiconductor element or the like. The reference position calculation processor 62 can be composed of, for example, a microcomputer, a CPU, an MPU, a GPU, a DSP, an FPGA, and an ASIC. The reference position calculation processor 62 realizes a predetermined function by reading data and a program stored in the storage 63 in the reference position setting device 60 and performing various types of arithmetic processing. A function of the reference position calculation processor 62 may be configured only by hardware, or may be realized by combining hardware and software.

The reference position calculation processor 62 includes a vehicle posture estimator 62a and a reference position calculator 62b as a functional configuration.

The vehicle posture estimator 62a estimates a displacement amount from a reference vehicle posture when the vehicle is stationary on the basis of the posture variation information of the vehicle 200 sent from the posture detection device 40. For example, a displacement amount in the pitch direction of a front end of the vehicle 200 is estimated on the basis of a vehicle height amount from the vehicle height sensor 43. This displacement amount is estimated as, for example, an angle amount from a reference level. The estimated displacement amount of the vehicle posture is output to the reference position calculator 62b.

The reference position calculator 62b calculates a reference position at which the virtual image Iv is displayed on the basis of the estimated displacement amount of the vehicle posture. The reference position calculator 62b stores the calculated reference position of the virtual image Iv in the storage 63. Note that a reference position P0 may be set on the basis of the vehicle-related information, map data, and the like that can be acquired from the information acquisition device 20.

The storage 63 is a storage medium that stores a program and data required to realize a function of the reference position calculation processor 62. Therefore, for example, a program and data necessary for causing an arithmetic device such as a processor to function as the reference position calculation processor 62 are also stored in the storage 63. The storage 63 can be realized by, for example, a hard disk (HDD), an SSD, a RAM, a DRAM, a ferroelectric memory, a flash memory, a magnetic disk, or a combination of these.

Figure 3A:
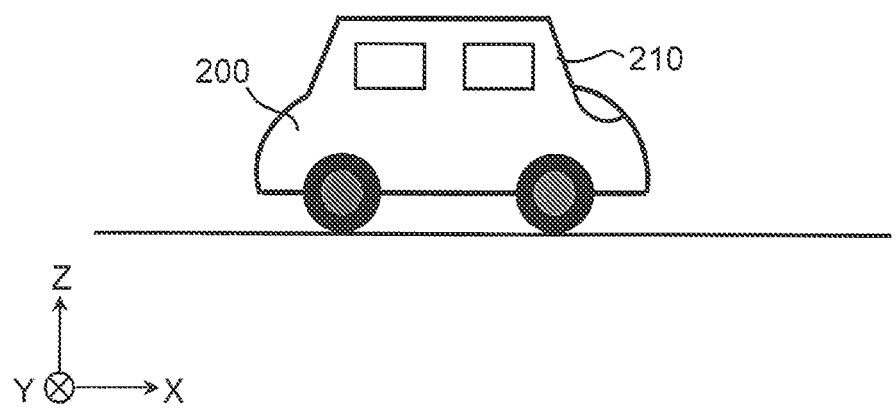
FIG. 3A is a diagram showing an example when a vehicle does not lean.
Figure 3B:
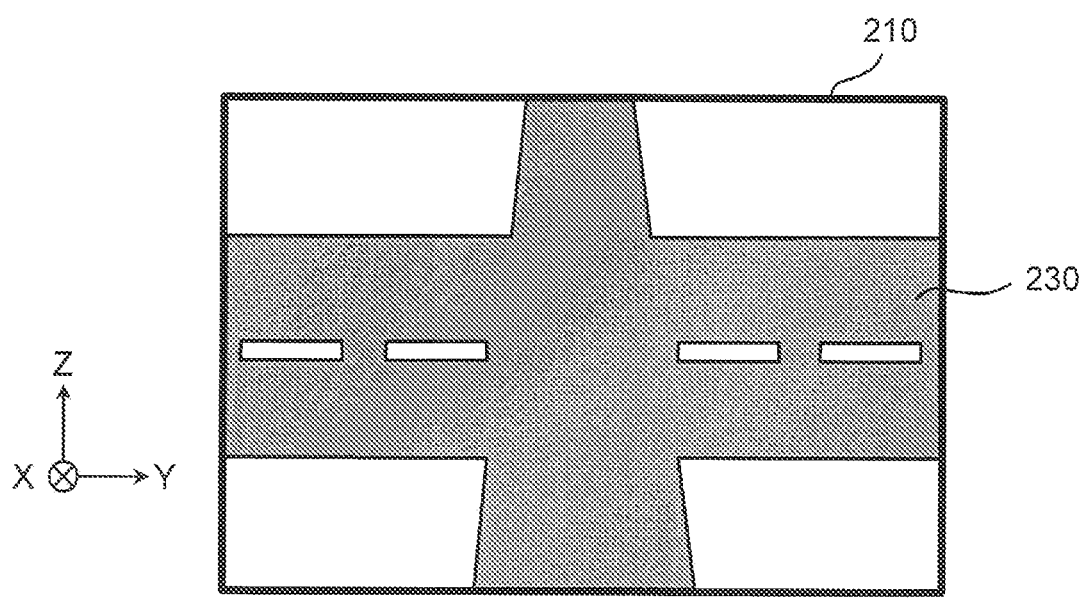
FIG. 3B is a diagram showing an example of an actual view as seen from a windshield.
Figure 3C:
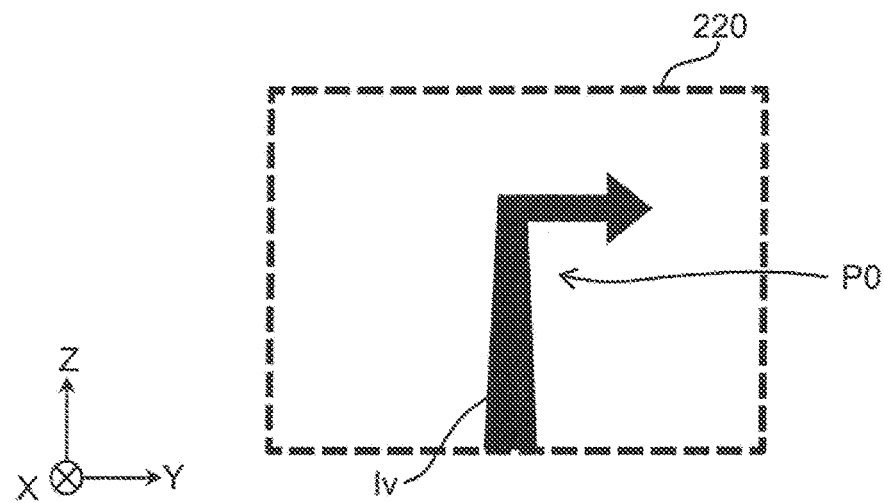
FIG. 3C is a diagram showing an example in which a virtual image is displayed at a reference position.
Figure 3D:
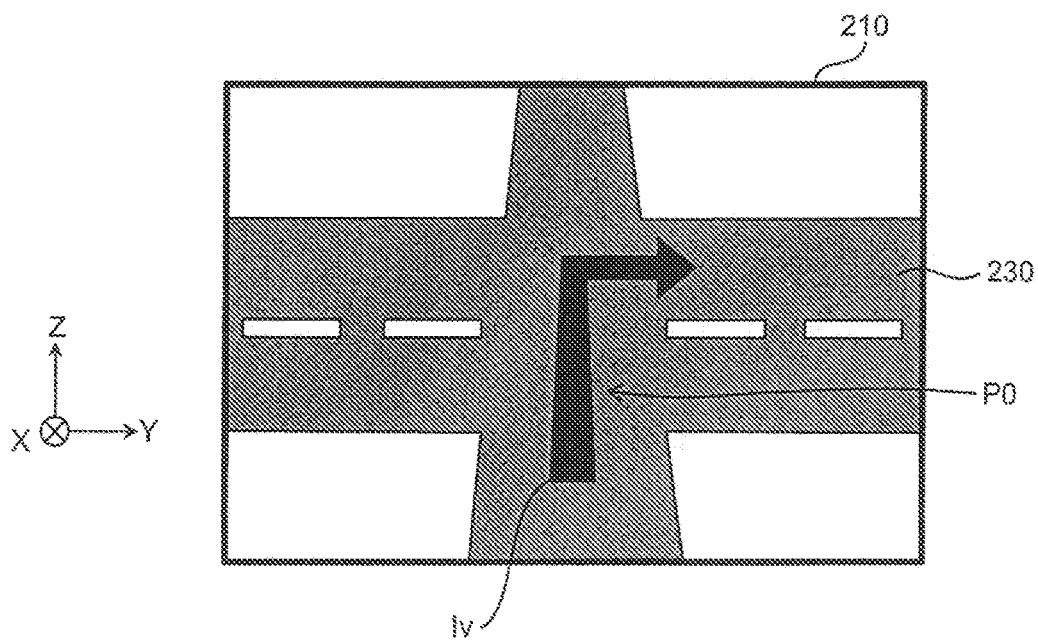
FIG. 3D is a diagram showing an example of augmented reality (AR) display.

AR display will be described with reference to FIGS. 3A to 3D. FIG. 3A shows an example when the vehicle 200 does not lean. FIG. 3B shows an example of an actual view seen from the windshield 210 of the vehicle 200 shown in FIG. 3A. FIG. 3C shows an example of the virtual image Iv seen from the display area 220. FIG. 3D shows an example in which the virtual image Iv shown in FIG. 3C is displayed in a manner superimposed on the actual view shown in FIG. 3B. The display system 100 superimposes the virtual image Iv shown in FIG. 3C on the actual view shown in FIG. 3B. The reference position (initial position) P0 of the virtual image Iv is a position determined based on the type of the virtual image Iv, the state of the vehicle 200 (position and posture), map data, and the like, and the reference position P0 is determined by the reference position setting device 60. For example, in a case where a display target 230 is a cruising lane and the virtual image Iv is an arrow indicating a traveling direction, the reference position P0 is a display position on liquid crystal display when a tip of an arrow indicates the center of the cruising lane. The reference position P0 is set, for example, at a position of a pixel on liquid crystal display corresponding to the values of the Y coordinate and the Z coordinate in the display area 220 in FIG. 3C. The display processing device 30 may set the size of the virtual image Iv based on the vehicle-related information.

Figure 4A:
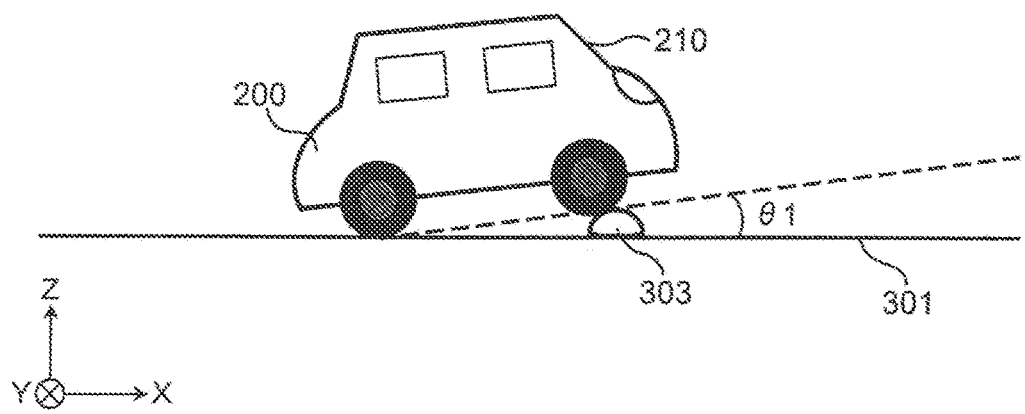
FIG. 4A is a diagram showing a rearward leaning posture of a vehicle.
Figure 4B:
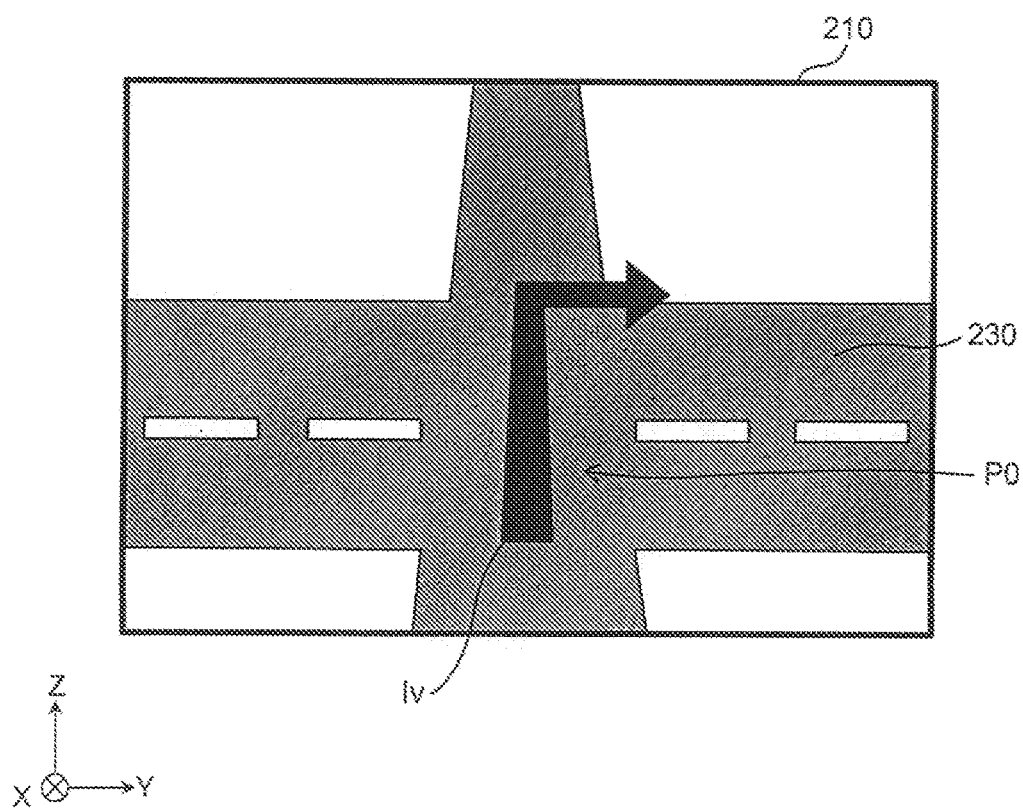
FIG. 4B is a diagram for explaining an example in which position displacement of a virtual image occurs when a vehicle is in a rearward leaning posture.

FIG. 4A shows an example of a state in which vehicle 200 is in a rearward leaning posture. FIG. 4B illustrates a case where the display position of the virtual image Iv is displaced from the display target 230 according to the posture variation of the vehicle 200. FIG. 4C shows the display position of the virtual image Iv after correction.

The vehicle 200 may lean due to unevenness of the road surface, sudden acceleration or deceleration of the vehicle 200, or the like. For example, when the vehicle 200 runs on a projecting portion 303 of a road surface 301, the vehicle 200 is in a rearward leaning posture as illustrated in FIG. 4A. In this case, as shown in FIG. 4B, the position of the display target 230 seen from the windshield 210 changes according to an inclination $\theta 1$ with respect to a track of the vehicle 200. For this reason, in a case where the virtual image Iv is displayed at the reference position P0, the virtual image Iv is displaced from the display target 230.

For example, as illustrated in FIG. 4B, when the vehicle 200 is in a rearward leaning posture due to the projecting portion 303 of road surface 301, the position of the display target 230 changes downward from the position during the normal traveling. Therefore, the tip of the arrow of the displayed virtual image Iv displayed at the reference position P0 is displaced to the outside of the lane. Therefore, the display system 100 adjusts the display position of the virtual image Iv in the direction of eliminating the displacement according to the posture of the vehicle 200.

Specifically, as shown in FIG. 4C, the vibration correction processing device 50 calculates a correction amount C by which the display position becomes a position P1 where there is no displacement in the display position due to the angle of the vehicle 200. That is, the display processing device 30 sets the display position of the virtual image Iv to "reference position P0+correction amount C". In this manner, the projection device 10 can display the virtual image Iv at the position P1 corresponding to the display target 230. As described above, even in a case where the vehicle 200 leans, the display position of the virtual image Iv is changed from the reference position P0 based on the correction amount C, so that the virtual image Iv can be displayed at the position P1 corresponding to the display target 230 in the actual view.

However, the reference position P0 may change based on a variation in the posture due to a change in the number of occupants and the load, and a decrease in gasoline and the like, and may be, for example, different from the reference position (initial position) calculated first.

As will be described later, the display system 100 of the present embodiment can update the reference position P0 by estimating a change in the vehicle posture of the vehicle 200 and calculating a reference position from an estimated change amount of the vehicle posture.

2. Operation of Display Processing Device

Figure 5:
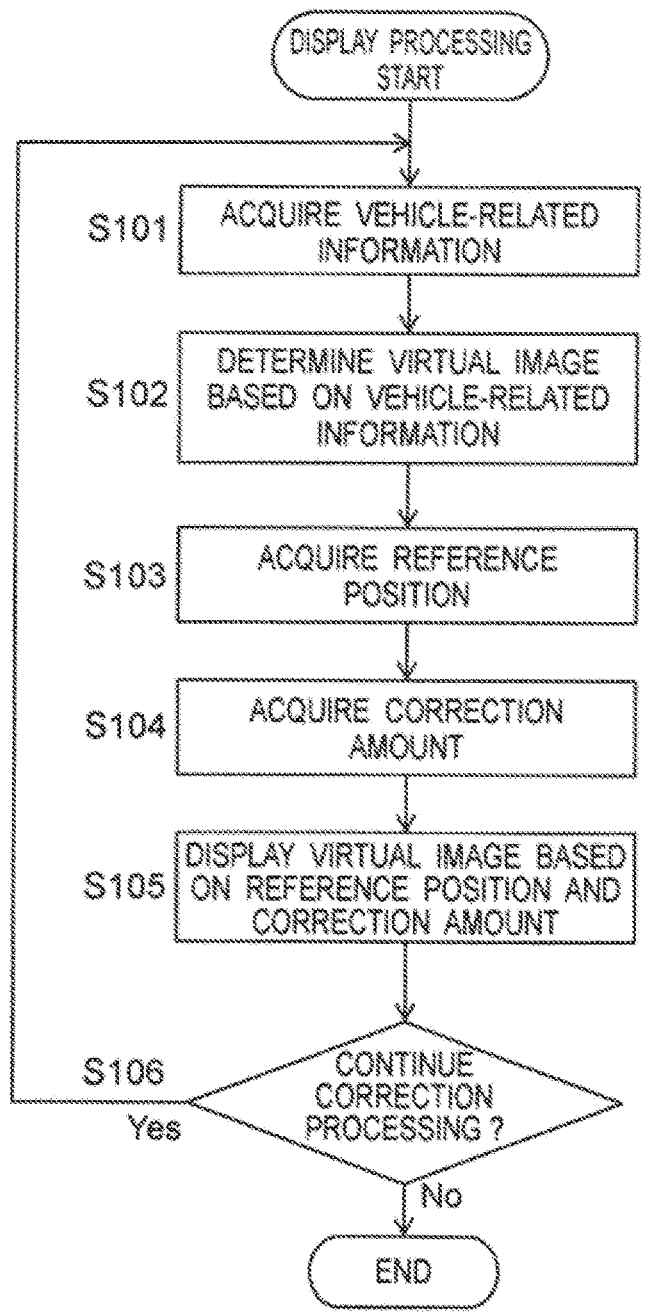
FIG. 5 is a flowchart showing display processing in the first embodiment.

FIG. 5 shows display processing performed by the display controller 32 of the display processing device 30. The display processing shown in FIG. 5 is started, for example, when the engine of the vehicle 200 is started or when a button for instructing the start of displaying the virtual image Iv is operated.

The display controller 32 acquires the vehicle-related information from the information acquisition device 20 (S101). The display controller 32 determines the virtual image Iv to be displayed based on the vehicle-related information (S102). In a case of receiving a timing signal Fa3 for resetting vibration correction from the vibration correction processing device 50, the display controller 32 acquires the reference position P0 of the virtual image Iv from the storage 63 of the reference position setting device 60 via the vibration correction processing device 50 (S103). Note that the reference position setting device 60 may transmit the reference position P0 directly from the storage 63 of the reference position setting device 60 to the display processing device 30. Further, in a case where the display controller 32 does not receive the timing signal Fa3 for resetting vibration correction from the vibration correction processing device 50, the reference position P0 that is previously used is used. The display controller 32 acquires the correction amount C of the display position output from the vibration correction processing device 50 (S104).

The display controller 32 causes the projection device 10 to display the virtual image Iv based on the reference position P0 and the correction amount C (S105). For example, the display controller 32 reads the image data 33i of the virtual image Iv corresponding to the display target from the storage 33, sets the display position of the virtual image Iv to "reference position P0+correction amount C", and outputs the display position to the projection device 10.

The display controller 32 determines whether or not to continue the display processing (S106). For example, the display controller 32 ends the display processing when the engine of the vehicle 200 is stopped or when a button for giving an instruction to end the display of the virtual image Iv is operated. In a case where the display processing is continued, the processing returns to Step S101.

3. Operation of Correction Processing Device

Figure 6:
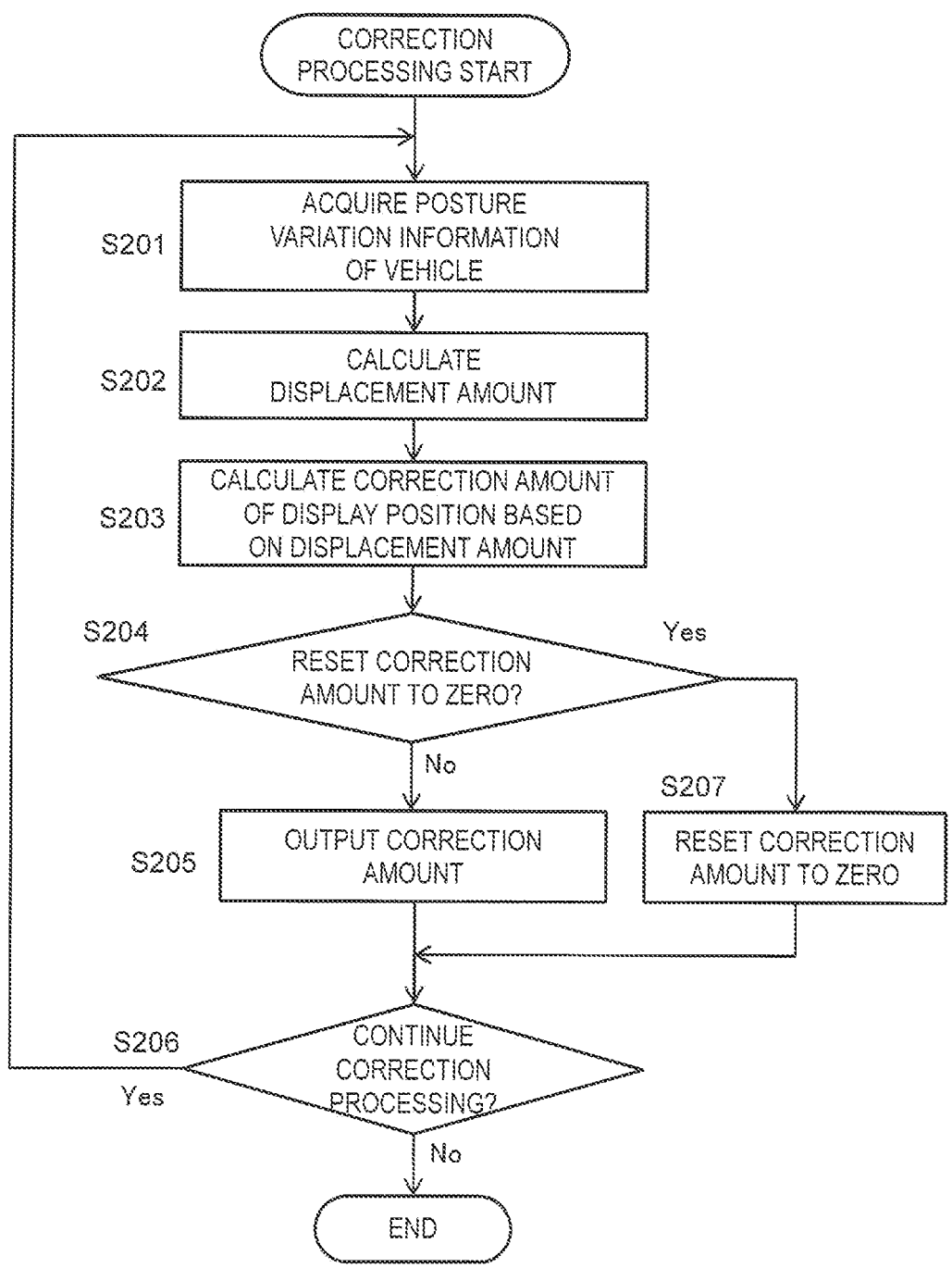
FIG. 6 is a flowchart showing correction processing in the first embodiment.

FIG. 6 shows correction processing performed by the correction controller 52 of the vibration correction processing device 50. The correction processing shown in FIG. 6 is started, for example, when the engine of the vehicle 200 is started or when a button for instructing the start of displaying the virtual image Iv is operated. The correction processing of FIG. 6 is started, for example, together with the display processing of FIG. 5. Note that the correction processing shown in FIG. 6 may be started when the button for instructing the start of the position correction of the virtual image Iv is operated.

The displacement amount calculator 52a acquires the posture variation information indicating the angular velocity output from the gyro sensor 41 (S201). The displacement amount calculator 52a calculates the posture of the vehicle 200, that is, the displacement amount which is an angle with respect to the three-axis directions, based on the acquired posture variation information (S202). Specifically, the displacement amount calculator 52a calculates the angle of the vehicle 200 by integrating the angular velocity. The correction amount calculator 52b calculates the correction amount C of the display position of the virtual image Iv based on the displacement amount with respect to the three-axis directions (S203). Specifically, the correction amount calculator 52b converts the displacement amount, which is the angle of the vehicle 200, into the number of pixels for the pitch angle and the yaw angle, and determines the correction amount C that cancels the displacement amount indicated by the number of pixels. For the roll angle, the correction amount C that cancels the displacement amount is determined while the roll angle is kept as an angle.

In the present embodiment, the correction amount C is defined as "correction amount C=−(current displacement amount)+(displacement amount at the time of zero reset)". Hereinafter, the displacement amount at the time of zero reset is also referred to as an offset value. The offset value is set in Step S207 described later. The initial value of the offset value is, for example, zero. In the calculation of the correction amount in Step S203, the configuration may be such that the displacement amount calculator 52a calculates, in units of angle, "−current posture (angle)+offset value (angle)" and outputs the value to the correction amount calculator 52b, and the calculator 52b converts the input value into the number of pixels. Further, the configuration may be such that the displacement amount calculator 52a outputs the current posture (angle) to the correction amount calculator 52b, and the correction amount calculator 52b converts the posture (angle) into the number of pixels, and then calculates "−current displacement amount (number of pixels)+offset value (number of pixels)".

The determiner 52c of the correction controller 52 determines whether or not to reset the correction amount C to zero (S204). When the determiner 52c determines not to reset the correction amount C to zero (No in S204), the correction amount calculator 52b outputs the calculated correction amount C to the display processing device 30 (S205). In this manner, the virtual image Iv is displayed at the position indicated by the "reference position P0+correction amount C".

When the determiner 52c determines to reset the correction amount C to zero (Yes in S204), the vibration correction processing device 50 transmits the timing signal Fa3 for resetting vibration correction to the reference position setting device 60 and the display processing device 30, and the correction controller 52 resets the correction amount C to zero (S207). Specifically, for example, the displacement amount calculator 52a sets the offset value (angle) to "offset value (angle)=posture (angle)". In this manner, the angle indicated by "−posture (angle)+offset value (angle)", that is, zero degrees is output from the displacement amount calculator 52*a* to the correction amount calculator 52*b*. Alternatively, the correction amount calculator 52*b* converts the posture (angle) calculated by the displacement amount calculator 52*a* into the number of pixels (the number of displacement pixels), and sets the offset value (the number of pixels) to "offset value (number of pixels)=number of displacement pixels". In this manner, the correction amount C calculated by "−displacement amount (number of pixels)+ offset value (number of pixels)" becomes zero. As described above, when the determiner 52*c* determines to reset the correction amount, the display position is returned to the reference position P0.

The correction controller 52 determines whether or not to continue the correction processing (S206). For example, the correction controller 52 ends the correction processing when the engine of the vehicle 200 is stopped or when a button for instructing the end of the display of the virtual image Iv is operated. In a case where the correction processing is continued, the processing returns to Step S201. After the processing returns to Step S201, the offset value set previously in Step S207 is used in the calculation of the correction amount in Step S203 next.

As described above, in the present embodiment, "offset value=displacement amount" is set when disturbance occurs, so that the correction amount C is set to zero. In other words, the display position is reset to the reference position P0 when the virtual image Iv vibrates significantly. Since "correction amount C=−displacement amount+offset value", the "reference position P0+correction amount C" that is the display position when the virtual image Iv is displayed next time (Step S105 in FIG. 5) is equivalent to "reference position P0+offset value−displacement amount".

4. Operation of Reference Position Setting Device

Figure 7:
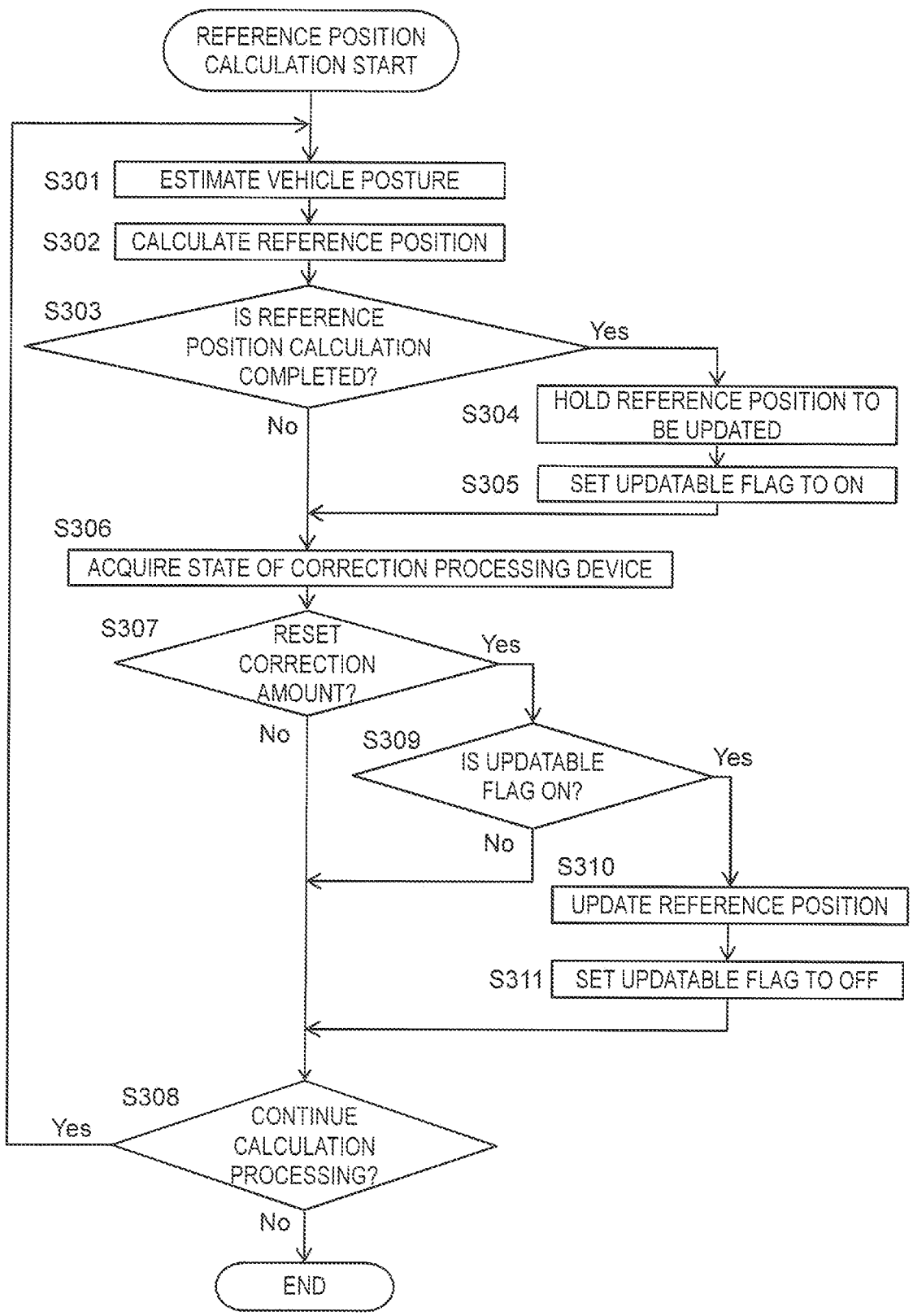
FIG. 7 is a flowchart showing reference position calculation processing in the first embodiment.

FIG. 7 shows calculation processing performed by the reference position calculation processor 62 of the reference position setting device 60. The calculation processing shown in FIG. 7 is started, for example, when the engine of the vehicle 200 is started or when a button for instructing the start of displaying the virtual image Iv is operated. The calculation processing of FIG. 7 is started, for example, together with the display processing of FIG. 5 and the correction processing of FIG. 6.

The vehicle posture estimator 62*a* acquires the posture variation information output from the posture detection device 40, estimates the vehicle posture of the vehicle 200, and estimates a posture displacement amount from the reference position when the vehicle is stationary (S301). The reference position calculator 62*b* calculates the reference position of the virtual image Iv on the basis of the estimated posture displacement amount (S302). The reference position calculation processor 62 determines whether or not the calculation of the reference position is completed (S303), and in a case where the calculation of the reference position is completed by the reference position calculator 62*b* (Yes in S303), the calculated reference position P0 is held in the storage 63 as the reference position P0 to be updated (S304). Furthermore, the reference position calculation processor 62 sets an updatable flag Fa2 of the reference position to ON (S305). Further, in a case where the calculation of the reference position by the reference position calculator 62*b* is not completed (No in S303) and after the updatable flag Fa2 is set to ON, the reference position calculation processor 62 of the reference position setting device 60 acquires a state of the vibration correction processing device 50 (S306). For example, the reference position calculation processor 62 receives the timing signal Fa3 for resetting vibration correction from the correction controller 52.

Upon receiving the timing signal Fa3 from the correction controller 52, the reference position calculation processor 62 recognizes that the correction amount is reset (Yes in Step S307), and furthermore, the reference position calculation processor 62 determines whether or not the updatable flag Fa2 is in an ON state (S309). When determining that the updatable flag Fa2 is in an ON state (Yes in S309), the reference position calculation processor 62 transmits the latest reference position P0 for update held in the storage 63 from the communicator 61 to the display processing device 30. The display controller 32 updates the reference position by displaying the virtual image Iv using the reference position P0 for update (S310). When transmitting the reference position P0 for update to the display processing device 30, the reference position calculation processor 62 sets the updatable flag Fa2 of the reference position to OFF (S311).

The reference position calculation processor 62 determines whether or not to continue the calculation processing of the reference position (S308). For example, when the engine of the vehicle 200 is stopped, when a button for instructing to end the display of the virtual image Iv is operated, or the like, the reference position calculation processor 62 ends the calculation processing of the reference position. In a case where the calculation processing of the reference position is continued, the processing returns to Step S301. Further, when the correction amount is not reset (No in Step S307) or when the updatable flag Fa2 is determined to be in an OFF state (No in S309), the reference position calculation processor 62 proceeds to Step S308.

Figure 8:
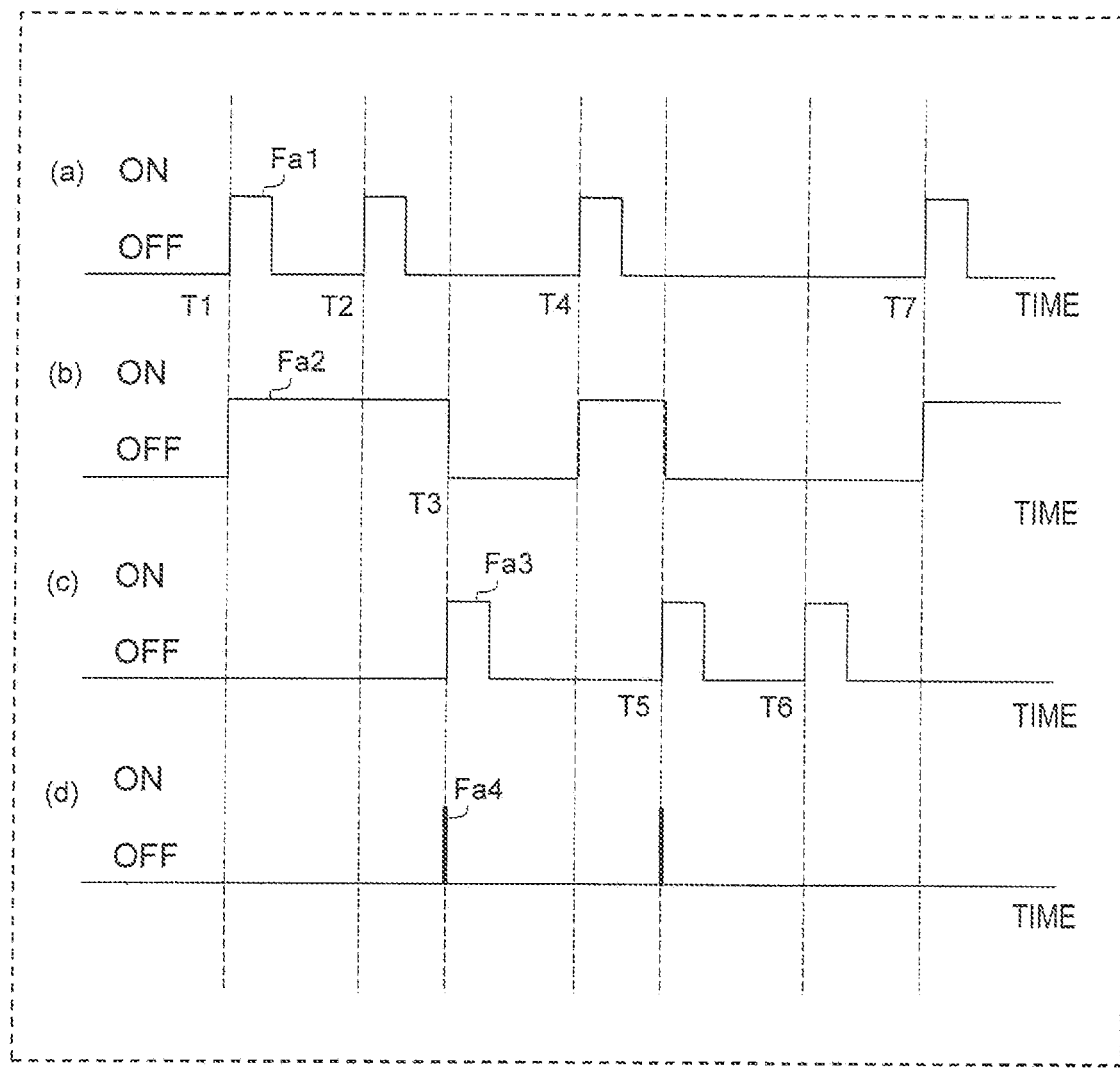
FIG. 8 is a diagram showing a relationship between a reference position calculation timing, a reference position updatable flag, a vibration correction reset timing, and a reference position update timing.

FIG. 8 is a diagram illustrating a relationship between a reference position calculation timing, a reference position updatable flag, a vibration correction reset timing signal, and a reference position update timing. FIG. 8(*a*) illustrates an example of a reference position calculation timing Fa1. FIG. 8(*b*) illustrates the updatable flag Fa2 of the reference position. FIG. 8(*c*) illustrates the timing signal Fa3 for resetting vibration correction. FIG. 8(*d*) is a diagram illustrating an update timing Fa4 of the reference position.

As illustrated in FIG. 8(*a*), the reference position calculator 62*b* calculates the reference position P0 as needed when the vehicle 200 is in a state suitable for calculation of the reference position. In FIG. 8(*a*), the reference position P0 is calculated at time points of T1, T2, T4, and T7. The state of the vehicle 200 suitable for calculation of the reference position is, for example, a state in which the vehicle 200 is stationary or a state in which an acceleration is within a predetermined threshold value. These states are determined by the vehicle posture estimator 62*a* on the basis of information from the information acquisition device 20 and the posture variation information from the posture detection device 40.

When the reference position calculator 62*b* completes the calculation of the reference position, the reference position calculator 62*b* sets the updatable flag Fa2 of the reference position to ON. When the updatable flag Fa2 of the reference position is in an ON state, the vibration correction processing device 50 transmits the timing signal Fa3 for resetting vibration correction to the reference position setting device 60 and the display processing device 30. A time point T3 at which the timing signal Fa3 is set to ON with the updatable flag Fa2 being in an ON state is the update timing Fa4 of the reference position. At the update timing Fa4 of the reference position, the reference position setting device 60 transmits the reference position P0 for update to the display controller 32. The display controller 32 can display a virtual image in which the correction amount is reset at the updated reference position P0 by displaying an image on the basis of the correction amount to be reset, the reference position P0 for update transmitted from the storage 63, and the timing signal Fa3.

Figure 9:
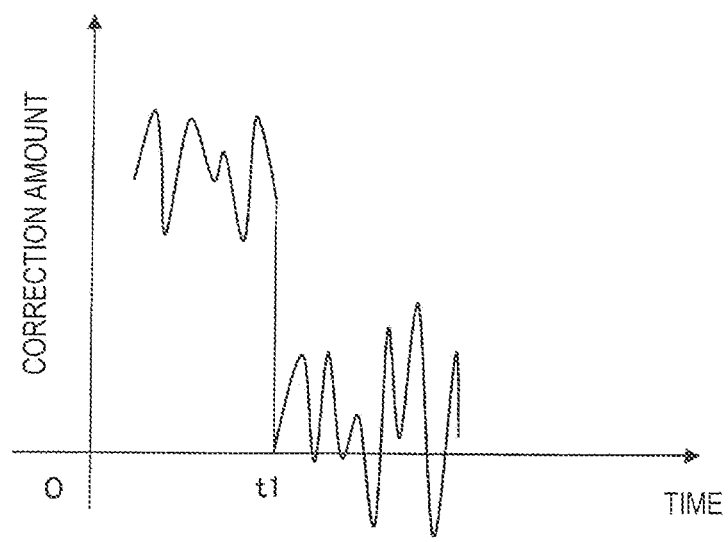
FIG. 9 is an explanatory diagram showing an example of resetting a correction amount to zero.

FIG. 9 is an explanatory diagram explaining an example of resetting the correction amount to zero. For example, at time t1, the display controller 32 immediately resets the correction amount to zero. Since the reference position P0 is updated in accordance with this timing, movement due to the update of the reference position can be made inconspicuous to the driver.

4. Effect, Supplement, and the Like

The display system 100 of the present disclosure includes the posture detection device 40 that detects a posture variation amount of the vehicle 200, the vehicle posture estimator 62a that estimates a posture state of the vehicle 200 on the basis of the posture variation amount, the reference position setting device 60 that sets the reference position P0 of the virtual image Iv on the basis of the posture state, the vibration correction processing device 50 that sets a correction amount of a display position of the virtual image Iv on the basis of the posture variation amount, and the display processing device 30 that controls the display position of the virtual image Iv on the basis of the reference position, the correction amount, and the timing signal Fa3 for resetting vibration correction.

Since update of the reference position P0 of the virtual image Iv with respect to a stationary state of the vehicle 200 is performed simultaneously with reset of a correction amount of the displacement by vibration correction during traveling, the displacement correction of the reference position of the virtual image Iv becomes inconspicuous to the driver, and the stress can be reduced.

Further, the display system 100 of the present embodiment further includes the projection device 10 that projects light representing a virtual image. In the present embodiment, the moving body is a vehicle, and the image is a virtual image displayed in front of the windshield of the vehicle.

Note that the method of resetting the correction amount to zero in Step S210 is optional. In the present embodiment, "correction amount C=−displacement amount+offset value" is used. However, the correction amount C may be "correction amount C=−displacement amount". In this case, the correction amount C is reset to zero by setting the displacement amount itself to zero. Specifically, in a case where the vehicle posture is calculated based on the output of the gyro sensor 41, the integration amount of the angular velocity calculated by the displacement amount calculator 52a is reset to zero.

SECOND EMBODIMENT

In the first embodiment, update of the reference position is also instantaneously performed in accordance with zero reset of the correction amount. In a second embodiment, in accordance with gradual resetting of the correction amount over time, update of the reference position is also performed to gradually approach an update position.

Figure 10:
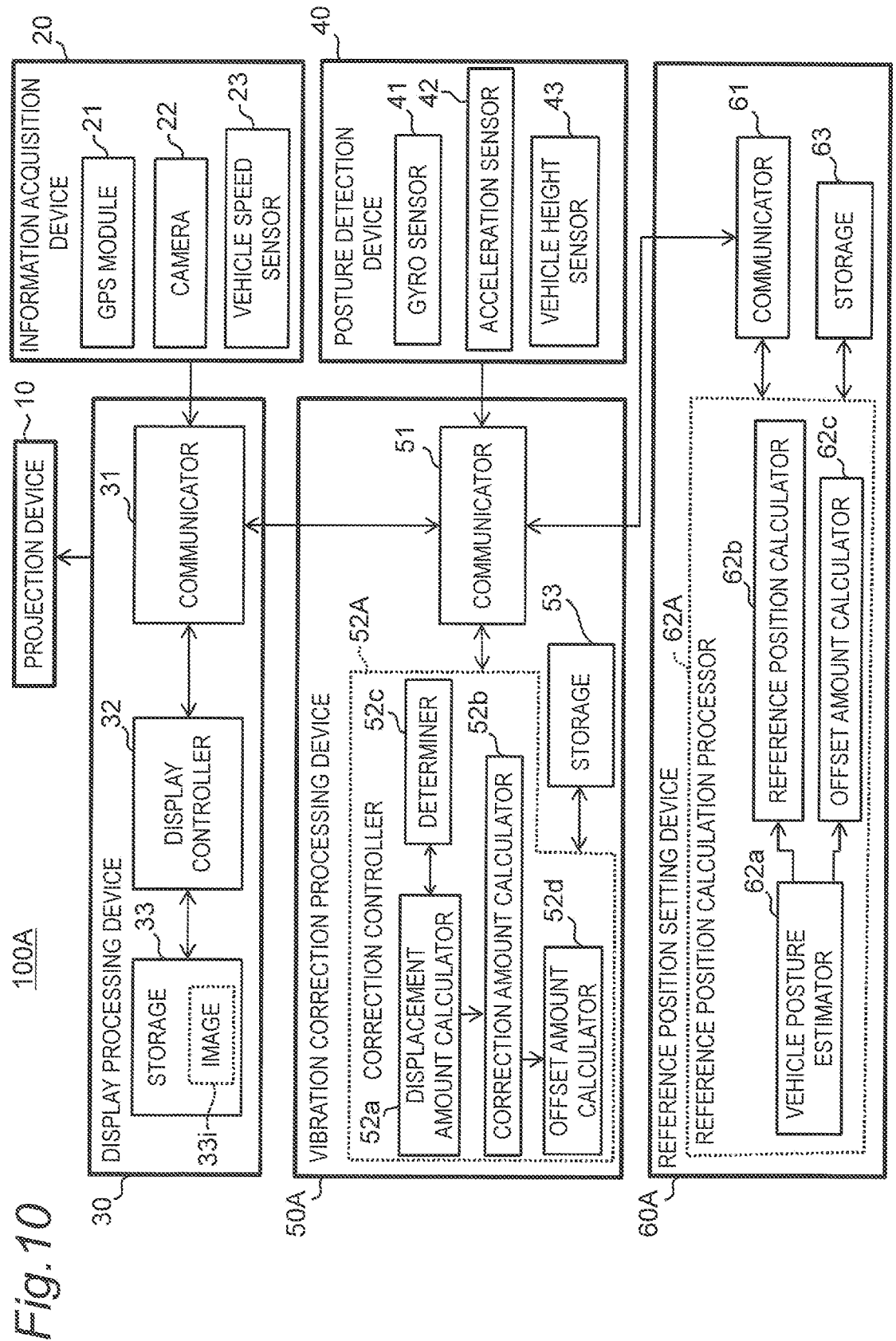
FIG. 10 is a block diagram illustrating an internal configuration of the display system according to a second embodiment.

FIG. 10 is a block diagram illustrating an internal configuration of a display system 100A according to the second embodiment. The display system 100A in the second embodiment includes the projection device 10, the information acquisition device 20, the display processing device 30, a vibration correction processing device 50A, a reference position setting device 60A, and the posture detection device 40. A correction controller 52A of the vibration correction processing device 50A in the second embodiment has a configuration in which an offset amount calculator 52d is added to the correction controller 52 of the vibration correction processing device 50 in the first embodiment. Further, a reference position calculation processor 62A of the reference position setting device 60A in the second embodiment has a configuration in which an offset amount calculator 62c is added to the reference position calculation processor 62 of the reference position setting device 60 in the first embodiment.

In the offset amount calculator 52d of the correction controller 52, for example, reset time $\Delta t1$ for resetting the correction amount is set in advance, and an offset amount Df1 in one sampling is calculated as $Df1=C1 \times ts/\Delta t1$ from a sampling period ts and a correction amount C1 at the start of resetting. The correction controller 52A decreases the correction amount C1 by $C1 \times ts/\Delta t1$. For example, assuming that the sampling period is 1/1000 [sec], the reset time $\Delta t1$ is 1 [sec], and the correction amount C1 is 100 pixels, the correction amount is reduced by 0.1 pixels per sampling period.

In the offset amount calculator 62c of the reference position calculation processor 62, update time $\Delta t2$ for bringing the reference position closer to the updated reference position P0 is set in advance, and may be the same as or shorter than the reset time $\Delta t1$ of the correction amount.

Figure 11A:
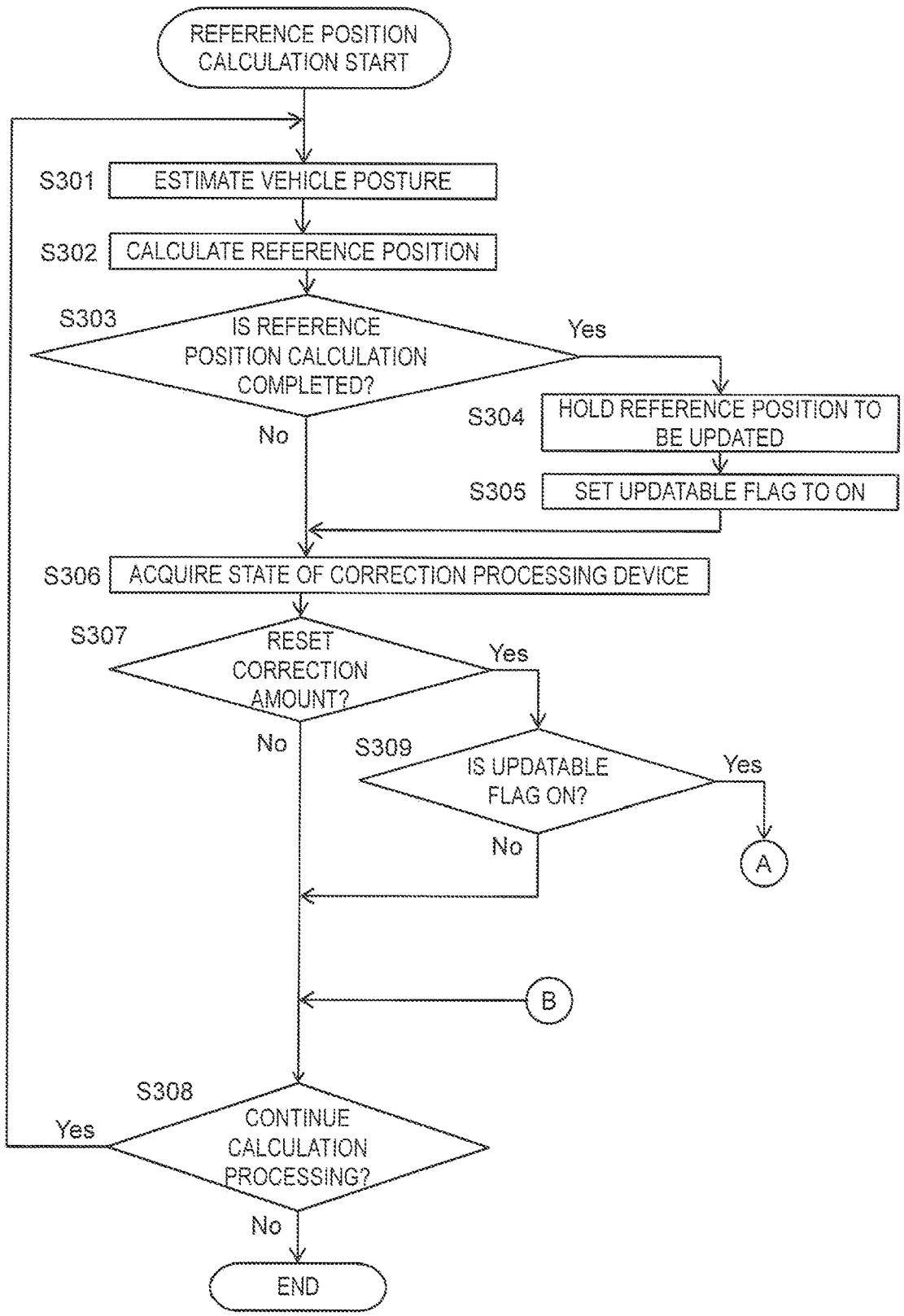
FIG. 11A is a flowchart showing the reference position calculation processing in the second embodiment.
Figure 11B:
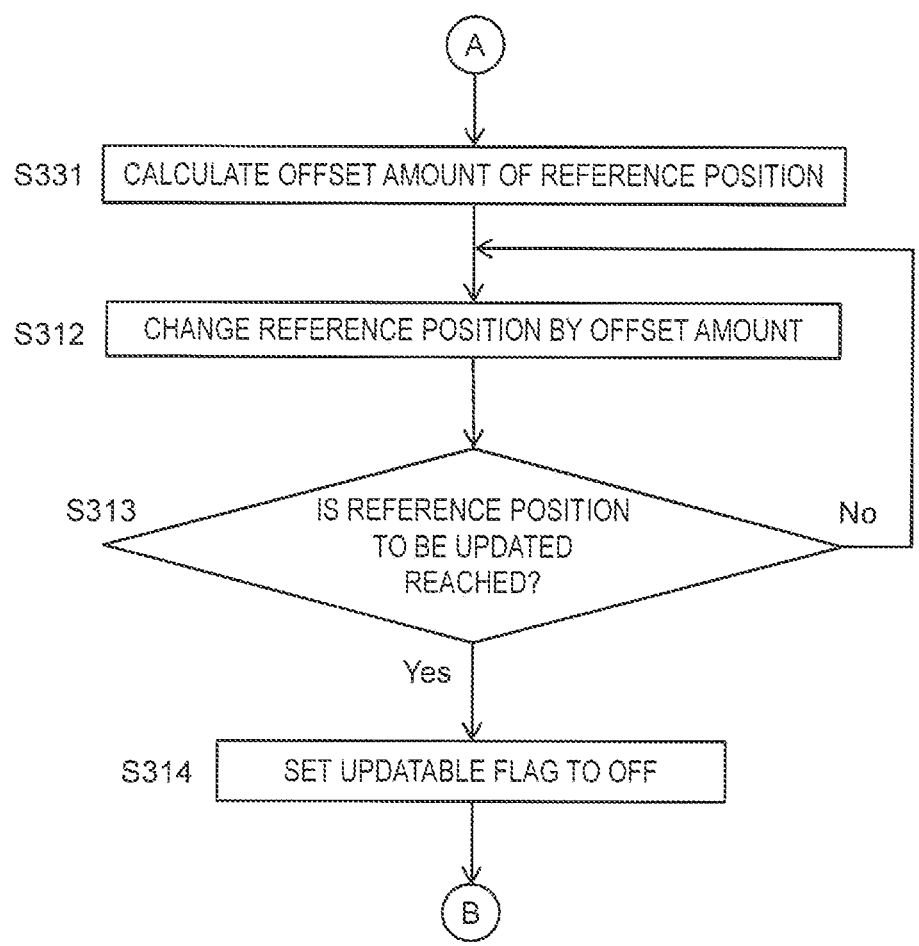
FIG. 11B is a flowchart showing the reference position calculation processing in the second embodiment.

FIGS. 11A and 11B show calculation processing performed by the reference position calculation processor 62A of the reference position setting device 60A in the second embodiment. In the present embodiment, the timing signal Fa3 transmitted from the correction controller 52 is a signal for starting processing of reducing a vibration correction amount by the offset amount Df1. When receiving the timing signal Fa3 from the correction controller 52, the reference position calculation processor 62A recognizes that the correction amount is reduced by a predetermined amount (Yes in Step S307), and when the reference position calculation processor 62A determines that the updatable flag Fa2 is in an ON state (Yes in S309), the offset amount calculator 62c calculates an offset amount B1 of the reference position via a reference symbol A in FIGS. 11A and 11B (S331). As the vibration correction processing device 50A offsets the correction amount by the offset amount Df, the display controller 32 changes the reference position P0 to the updated reference position P0 by the offset amount B1 (S312). For example, the reference position calculation processor 62A determines whether the reference position to be updated is reached from the number of times of changing to the updated reference position P0 by the offset amount B1 using a counter (S313).

In a case where the reference position calculation processor 62A does not determine that the reference position to be updated is reached (No in Step S313), the display controller 32 changes the reference position P0 to the updated reference position P0 by the offset amount B1 in accordance with the vibration correction processing device 50A offsetting the correction amount by the offset amount Df again. When the reference position calculation processor 62A determines that the reference position to be updated is reached (Yes in Step S313), the reference position calculation processor 62A sets the updatable flag Fa2 to OFF (S314). After the above, it is determined whether or not to continue the calculation processing via a reference symbol B in FIGS. 11B and 11A (S308).

Figure 12:
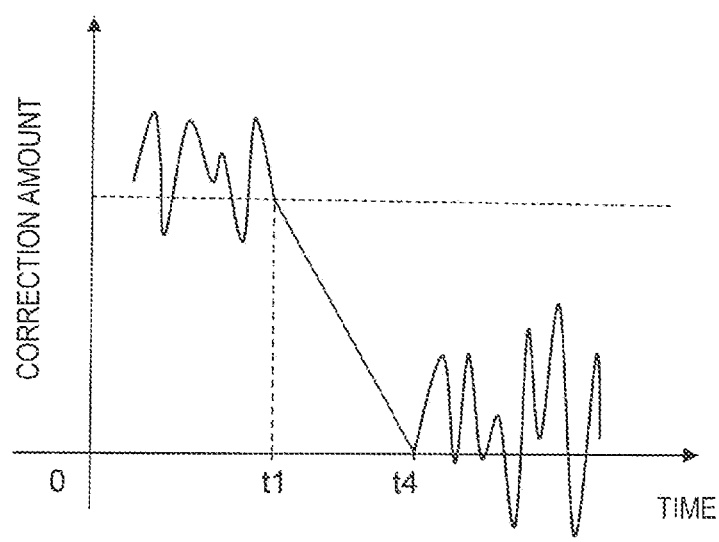
FIG. 12 is an explanatory diagram illustrating an example of reducing the magnitude of a correction amount over a certain period of time.

As illustrated in FIG. 12, since the magnitude of the correction amount gradually becomes smaller by the vibration correction processing device 50A, the position of the virtual image Iv gradually returns to the reference position P0. Since the position of the virtual image Iv does not suddenly change significantly, it is possible to prevent the occupant D from feeling uncomfortable with the change in the display position of the virtual image Iv. Furthermore, the reference position setting device 60A gradually brings the reference position closer to the updated reference position in accordance with the vibration correction processing device 50A gradually resetting the correction amount. In this manner, it is possible to reduce conspicuousness of update display of the reference position of the virtual image Iv.

THIRD EMBODIMENT

In the first embodiment, update of the reference position is performed in accordance with the timing at which the correction amount is reset to zero. In a third embodiment, update of the reference position is performed in accordance with a timing at which the virtual image is set to be not displayed instead of the timing at which the correction amount is reset to zero. Configurations other than this point and a point described below are common to the present embodiment and the first embodiment, and will be omitted from detailed description.

Figure 13:
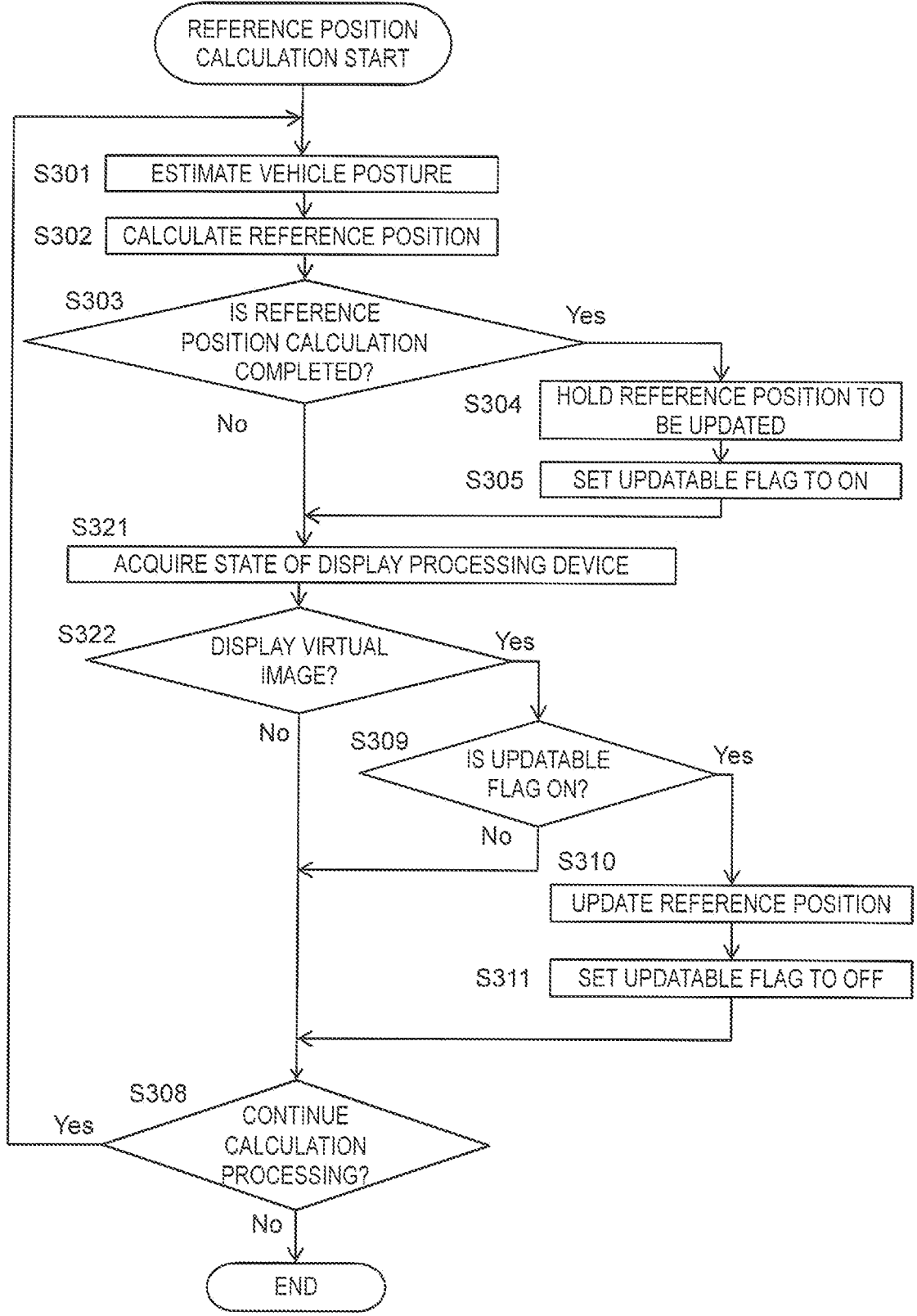
FIG. 13 is a flowchart showing the reference position calculation processing in the third embodiment.

FIG. 13 shows calculation processing performed by the reference position calculation processor 62 of the reference position setting device 60 in the third embodiment. Steps S301 to S305 and S308 to S311 of the third embodiment are similar to those of the first embodiment, and omitted from description.

As in the first embodiment, the reference position calculation processor 62 performs Steps S301 to S303. In a case where the calculation of the reference position by the reference position calculator 62b is not completed (No in S303) and after the updatable flag Fa2 is set to ON, the reference position calculation processor 62 acquires a state of the display processing device 30 (S321). For example, the reference position calculation processor 62 receives a display switching signal for switching display/non-display states of the virtual image from the display controller 32. For example, in a case where the virtual image is switched to the non-display state, the display controller 32 sets the display switching signal to an ON state.

When receiving the display switching signal in an ON state from the display controller 32, the reference position calculation processor 62 recognizes that the virtual image is switched to the non-display state (No in Step S322), and furthermore, the reference position calculation processor 62 determines whether or not the updatable flag Fa2 is in an ON state (S309). When determining that the updatable flag Fa2 is in an ON state (Yes in S309), the reference position calculation processor 62 transmits the latest reference position P0 for update held in the storage 63 from the communicator 61 to the display processing device 30. The display controller 32 updates the reference position by using the reference position P0 for update (S310). When the reference position calculation processor 62 transmits the reference position P0 for update to the display processing device 30, the reference position calculation processor 62 sets the updatable flag Fa2 of the reference position to OFF (S311).

The reference position calculation processor 62 determines whether or not to continue the calculation processing of the reference position (S308). In a case where the calculation processing of the reference position is continued, the processing returns to Step S301. Further, when the display controller 32 displays the virtual image, that is, when the reference position calculation processor 62 recognizes that the virtual image is not to be in the non-display state with the display switching signal in an OFF state (Yes in S322), or determines that the updatable flag Fa2 is in an OFF state (No in S309), the processing moves to Step S308.

With such a configuration, the display device 30 can update the reference position P0. Update of the reference position P0 of the virtual image Iv with respect to the stationary state of the vehicle 200 can be performed at a timing at which the virtual image Iv is set to be not displayed regardless of the zero reset operation of the correction amount of vibration correction. In this manner, the displacement correction of the reference position of the virtual image Iv becomes inconspicuous to the driver, and the stress can be reduced.

OTHER EMBODIMENTS

As described above, the embodiments have been described as an example of the technique disclosed in the present application. However, the technique in the present disclosure is not limited to this, and is also applicable to an embodiment in which changes, replacements, additions, omissions, and the like are appropriately made. In view of the above, other embodiments will be exemplified below.

The above embodiment illustrates the case where the projection device 10, the information acquisition device 20, the display processing device 30, the posture detection device 40, the vibration correction processing device 50, and the reference position setting device 60 are separate devices. However, a plurality of devices may be integrally formed as one device. For example, the display processing device 30 and the vibration correction processing device 50 may be integrally formed as one device. The information acquisition device 20 and the display processing device 30 may be integrally formed as one device. The posture detection device 40 and the vibration correction processing device 50 may be integrally formed as one device. The separately formed devices are connected in a manner communicable with each other by wire or wirelessly. Note that all the projection device 10, the information acquisition device 20, the display processing device 30, the posture detection device 40, the vibration correction processing device 50, and the reference position setting device 60 may be formed as one device. In this case, the communicators 31, 51, and 61 may be omitted.

The above embodiment describes the example in which the information acquisition device 20 includes the GPS module 21, the camera 22, and the vehicle speed sensor 23. However, the information acquisition device 20 may include a distance sensor that measures a distance and a direction from the vehicle 200 to a surrounding object, and may output distance information indicating the measured distance and direction to the display processing device 30. The information acquisition device 20 may include a navigation system. The information acquisition device 20 may include one or more of the GPS module 21, a distance sensor, the camera 22, an image processing device, an acceleration sensor, a radar, a sound wave sensor, and a white line detection device of advanced driver-assistance systems (ADAS). In this case, the GPS module 21, the camera 22, the vehicle speed sensor 23, a distance sensor, and the like having a function as the information acquisition device 20 may be built in one device or individually attached to the vehicle 200.

The above embodiment describes the case where the moving body is the vehicle 200 such as an automobile. However, the moving body is not limited to the vehicle 200. The moving body may be a vehicle that travels on the ground, and may be, for example, a train or a motorcycle. The moving body may be an unmanned moving body that is capable of autonomous driving.

The above embodiment describes the case where the image is displayed in front of the moving body. However, the position where the image is displayed is not limited to the front. For example, the image may be displayed in the side direction or in the rear of the moving body.

The above embodiment describes the example in which the display system 100 is an HUD system. However, the display system 100 does not need to be an HUD system. The display system 100 may include a liquid crystal display or an organic EL display instead of the projection device 10. Display system 100 may include a screen and a projector.

OUTLINE OF EMBODIMENT (1) A display system of the present disclosure is a display system including a posture detection device that detects a posture variation amount of a moving body, a posture estimator that estimates a posture state of the moving body based on the posture variation amount, a reference position setting device that sets a reference position of an image based on the posture state, a correction processing device that sets a correction amount of a display position of the image based on the posture variation amount, and a display processing device that controls a display position of the image based on the reference position, the correction amount, and a timing command.

In this manner, since the reference position at which an image is displayed can be adjusted, position displacement of the image can be accurately corrected. Furthermore, since the position displacement correction of the reference position is performed simultaneously with correction of the position displacement due to vibration, it is possible to make the correction inconspicuous. As a result, the display quality of the image can be maintained.

(2) In the display system of (1), the timing command may be a signal transmitted from the correction processing device at a timing at which the correction processing device resets the correction amount to zero.

(3) In the display system of (1), the timing command may be a signal transmitted from the correction processing device at a timing at which the correction processing device starts processing of reducing the correction amount by a predetermined amount.

(4) In the display system of (1), the timing command may be a signal generated at a timing at which the display processing device sets the image to be not displayed.

(5) In the display system of (2) to (4), the display processing device may change the reference position based on the timing command.

(6) The display system of (1) to (5) may further include a projection device that projects light representing an image.

(7) In the display system of (1) to (6), the moving body may be a vehicle, and the image may be a virtual image displayed in front of a windshield of a vehicle.

The display system described in the present disclosure is realized by cooperation with hardware resources, for example, a processor, a memory, a program, and the like.

INDUSTRIAL APPLICABILITY

The present disclosure can be applied to a display system that displays a virtual image in front of a windshield.

The invention claimed is:

1. A display system configured to display an image within a windshield of a moving body, comprising:
   a posture detection device that detects a posture variation amount of the moving body;
   a posture estimator that estimates a posture state of the moving body based on the posture variation amount;
   a reference position setting device that sets a reference position of the image displayed within the windshield based on the posture state, and calculates a reference position for update;
   a correction processing device that sets a correction amount of the image from the reference position based on the posture variation amount; and
   a display processing device that controls a display position of the image based on the reference position, the correction amount, and a timing signal, and that changes the reference position based on the timing signal, the timing signal being a signal indicating a timing based on, a signal transmitted from the correction processing device and a signal that updates the reference position based on a counter indicating a number of times the reference position is changed by a predetermined offset amount.

2. The display system according to claim 1, wherein the timing signal is generated when the display processing device sets the image to be not displayed.

3. The display system according to claim 1, wherein the correction processing device transmits the timing signal when the correction processing device starts processing of reducing the correction amount by a predetermined amount.

4. The display system according to claim 1, wherein the correction processing device transmits the timing signal when the correction processing device resets the correction amount to zero.

5. The display system according to claim 1, wherein the timing signal is generated when the display processing device sets the image to be not displayed.

6. The display system according to claim 1, wherein the correction processing device transmits the timing signal when the correction processing device starts processing of reducing the correction amount by a predetermined amount.

7. The display system according to claim 1, wherein the correction processing device transmits the timing signal when the correction processing device resets the correction amount to zero.

8. The display system according to claim 2, further comprising a projection device that projects light representing the image.

9. The display system according to claim 8, wherein the moving body is a vehicle, and the image is a virtual image displayed in front of a windshield of the vehicle.

10. The display system according to claim 3, wherein the moving body is a vehicle, and the image is a virtual image displayed in front of a windshield of the vehicle.

11. The display system according to claim 10, further comprising a projection device that projects light representing the image.

\* \* \* \* \*